US005351193A

United States Patent [19]

Poirier et al.

[11] Patent Number: 5,351,193

[45] Date of Patent: Sep. 27, 1994

[54] CANISTER PURGE CONTROL METHOD

[75] Inventors: David C. Poirier, Troy; John C. Haraf; George T. Stephens, both of Livonia; Robert C. Simon, Jr., Novi, all of Mich.; Edward G. Himes, Luxembourg, Luxembourg

[73] Assignee: General Motors Corporation, Detroit, Mich.

[21] Appl. No.: 103,324

[22] Filed: Aug. 9, 1993

Related U.S. Application Data

[63] Continuation of Ser. No. 722,479, Jul. 1, 1991, abandoned.

[51] Int. Cl.$^{5}$ .................... G06F 15/50; F02M 33/02

[52] U.S. Cl. .................... 364/431.01; 364/431.05; 364/431.06; 364/431.12; 123/519; 123/520

[58] Field of Search .................... 364/431.01, 431.12, 364/431.03, 431.05, 431.06; 123/520, 519, 674

[56] References Cited

U.S. PATENT DOCUMENTS

| | | | |
|---|---|---|---|
| 4,351,306 | 9/1982 | Luckman et al. | 123/609 |
| 4,467,769 | 8/1984 | Matsumura | 123/489 |
| 4,677,956 | 7/1987 | Hamburg | 123/520 |
| 4,741,318 | 3/1988 | Kortge et al. | 123/520 |
| 4,821,701 | 4/1989 | Nankee, II et al. | 123/520 |
| 4,932,386 | 1/1990 | Uozumi et al. | 123/520 |
| 4,961,412 | 10/1990 | Furuyama | 123/520 |
| 5,060,621 | 10/1991 | Cook et al. | 123/516 |
| 5,090,388 | 2/1992 | Hamburg et al. | 123/489 |
| 5,115,785 | 5/1992 | Cook | 123/520 |
| 5,216,991 | 6/1993 | Iida et al. | 123/519 |

*Primary Examiner*—Thomas G. Black
*Assistant Examiner*—Tan Q. Nguyen
*Attorney, Agent, or Firm*—Howard N. Conkey

[57] ABSTRACT

A fuel vapor canister is purged by admitting fuel vapor from the canister to the vehicle engine under control of a solenoid valve, the duty cycle of the valve being controlled to optimize the purge rate. Closed loop fuel correction and block learn fuel correction factors developed by the fuel control system are used to update a learned purge duty cycle which is stored in a keep-alive memory.

2 Claims, 5 Drawing Sheets

CANISTER PURGE CONTROL METHOD

This is a continuation of application Ser. No. 07/722,479 filed on Jul. 1, 1991, now abandoned.

FIELD OF THE INVENTION

This invention relates to a method of purging a fuel vapor canister by burning the vapor in the engine and particularly to such a method for controlling the purging rate in accordance with engine operating conditions such that the purge contribution to the total fueling is within the authority of a closed loop feedback.

BACKGROUND OF THE INVENTION

It is a common practice to minimize the emission of gasoline vapors from an automotive fuel tank by collecting the vapors in a canister containing charcoal, and to purge the canister by admitting its fuel vapors to the engine for combustion therein. The vapors are fed to the throttle body of the engine fuel system by a tube containing a solenoid valve for control of the purge operation. Typically purge has been allowed when the throttle is open, and engine coolant temperature, engine speed and vehicle speed are all above prescribed thresholds. The purge is controlled by a duty cycle operation of the solenoid valve. A low duty cycle is implemented when the purge is first enabled and the duty cycle gradually ramps up to 100% operation. Usually this allows the extra fuel to be accommodated by the engine and the fuel control system compensates by decreasing the injected fuel to maintain air/fuel stoichiometry. Still there are some conditions when the purge action provides too much fuel to the engine and an undesirable engine response such as surging may occur. Such excess fuel also can lead to undesirable emissions as well as to a high catalytic converter temperature.

In the fuel control system manifold pressure and temperature sensors provide information upon which a fuel amount is predicated. An exhaust oxygen sensor provides an air/fuel ratio signal to a closed loop control which generates a closed loop correction factor for adjustment of the fuel amount. When the closed loop correction factor reaches a set limit, a portion of that factor is rolled into a block learn correction factor which is stored in permanent memory and is also used for adjustment of the fuel amount. Several block learn factors are stored for use with different engine conditions, and each is updated according to the closed loop correction factor. The correction factors can compensate for purged fuel within limits. When those limits are reached it is then desirable to reduce the purge duty cycle and, consequently, the purged fuel vapor to an amount that the fuel control can manage. On the other hand it is important to maximize the purged fuel vapor rate to assure removal of the canister contents.

SUMMARY OF THE INVENTION

It is therefore an object of the invention to control the duty cycle of a canister purge system in accordance with the ability of the fuel system to manage the total fuel input to the engine. Another object is to use a learn algorithm to optimize the purge duty cycle.

The invention is carried out in a fuel control for an internal combustion engine equipped with an exhaust oxygen sensor (EOS) and a fuel vapor canister having a solenoid valve for purging fuel from the canister and admitting the fuel to the engine, and the fuel control having a microcomputer for determining a rapidly responsive closed loop fuel correction factor and a slowly responsive block learn fuel correction factor, the method of controlling the canister purge solenoid valve comprising the steps of: establishing a schedule of maximum solenoid duty cycle; recalling a learned purge duty cycle; operating the solenoid valve to admit fuel vapor from the canister to the engine; updating the block learn fuel correction factor to accommodate the fuel admitted from the canister; updating the learned duty cycle by decreasing the learned purge duty cycle when the block learn fuel correction factor reaches a minimum value and by increasing the learned purge duty cycle when the block learn fuel correction factor is above its minimum value; and storing the updated learned purge duty cycle.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
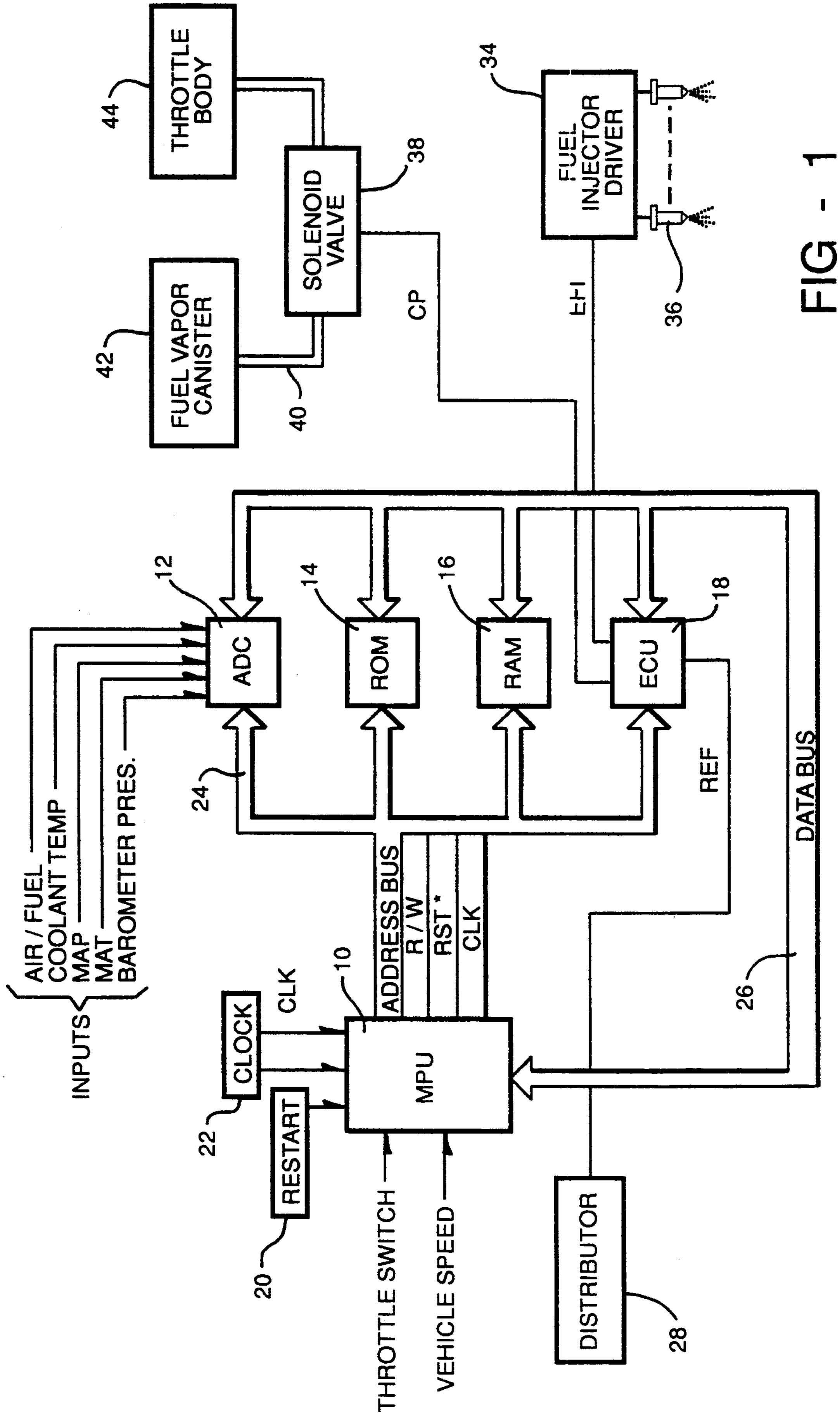
FIG. 1 is a schematic diagram of an electronic control system for carrying out the method of the invention.

An apparatus for carrying out the calculations and implementing the control commands of the invention is shown in FIG. 1 and is similar to that of the U.S. Pat. No. 4,351,306 to Luckman et al which is incorporated herein by reference and may be referred to for apparatus details not given here. The electronic control system includes a microprocessing unit (MPU) 10, an analog-to-digital converter (ADC) 12, a read-only memory (ROM) 14, a random access memory (RAM) 16 and an engine control unit (ECU) 18. A portion of the RAM 16 is powered full time to provide a keep-alive memory for storing parameters which are occasionally updated but which must be remembered even when the vehicle engine is turned off or the vehicle battery is removed. The MPU 10 receives inputs from a restart circuit 20 and generates a restart signal RST* for initializing the remaining components of the system. The MPU 10 also provides a R/W signal to control the direction of data exchange and a clock signal CLK to the rest of the system. The MPU 10 communicates with the rest of the system via a 16 bit address bus 24 and an 8-bit bi-directional data bus 26. The ADC 12 receives analog signals corresponding to air/fuel ratio from an exhaust oxygen sensor, engine coolant temperature, engine manifold air pressure (MAP), manifold air temperature (MAT) and barometric pressure and converts those signals to digital values for use by the MPU. Digital signals representing throttle switch condition and vehicle speed are coupled directly to the MPU.

The ROM 14 contains the program steps for operating the MPU 10, the engine calibration parameters for determining the appropriate fuel injection data in look-up tables which identify as a function of engine parameters the desired fuel pulse width. The MPU 10 may be programmed in a known manner to interpolate between the data at different entry points if desired. The control words specifying a desired duty cycle are periodically transferred by the MPU 10 to the ECU 18 for generating canister purge (CP) signals, and fuel injection (EFI) signals. The ECU 18 also receives the input reference pulses (REF) from a reference pulse generator within a distributor 28.

An EFI output signal of the ECU 18 is coupled to a fuel injector driver 34 which supplies actuating pulses to fuel injectors 36. To control canister purge a signal CP is calculated by the ECU and is coupled to a solenoid valve 38 which controls the passage 40 between the fuel vapor canister 42 and the throttle body 44 to provide an appropriate amount fuel vapor flow from the canister 42 to the engine.

A flow chart of a typical control algorithm according to the invention is displayed in FIGS. 2, 3, 5 and 7 and indicates the portion of the program embodied in the ROM 14 for determining the fuel control parameters and the canister purge control. The description of the program includes reference numerals in angle brackets <nn> which refer to the flow chart blocks corresponding to the described steps.

Figure 2:
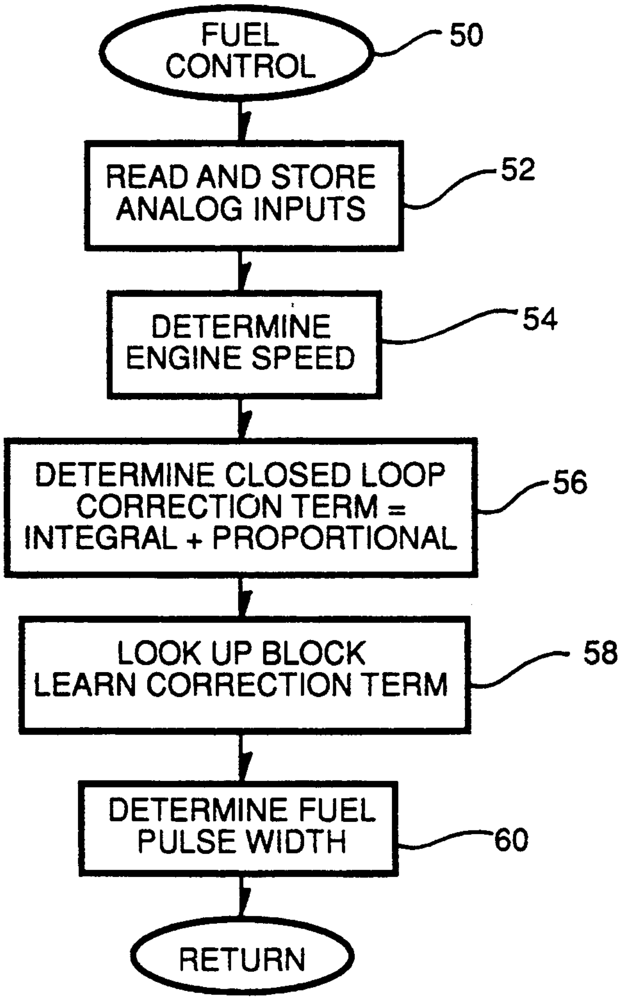
FIGS. 2, 3, 5, and 7 are flow diagrams illustrating the program for carrying out the method of the invention.
Figure 3:
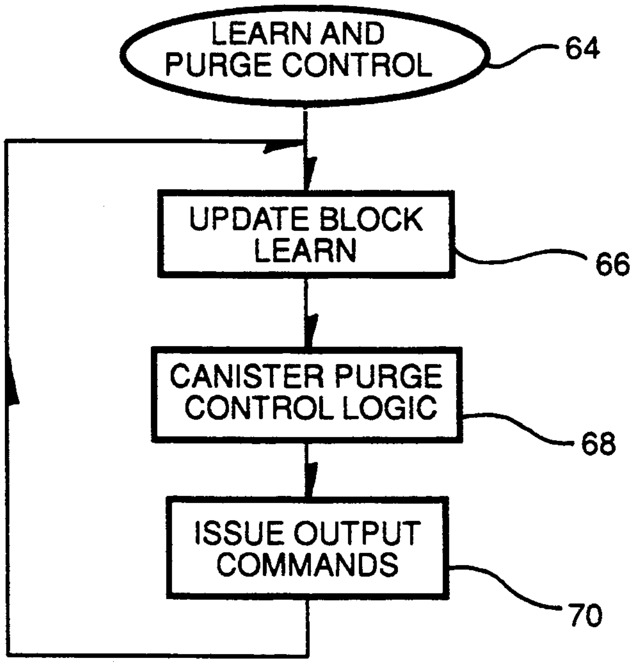

The operation of the electronic controller in controlling the injection of fuel to the engine is illustrated in FIG. 2. When power is first applied to this system from a vehicle battery (not shown) the computer program is initiated. The program may first provide for initialization of various random access memory variables to calibrated values and other functions. When this initialization routine is completed, a background loop may be executed that contains various system maintenance and diagnostic routines. This loop may be interrupted by one of possibly several system interrupts whereby control will be shifted to the appropriate interrupt service routine. In this embodiment, one such system interrupt is a high frequency interrupt provided at, for example, 12.5 msec intervals whereby a fuel control routine as illustrated in FIG. 2 is executed and another system interrupt is a lower frequency interrupt provided at, for example, 100 msec intervals during which a learn routine and a canister purge control routine are executed as illustrated in FIG. 3.

Referring to FIG. 2, the fuel control routine is generally illustrated that is repeatedly executed in response to the 12.5 16 msec interrupt. This routine provides for determining the fuel injection pulse width to be applied to the appropriate fuel injector of the engine. This routine is entered at point 50 and then reads and saves the values of the various analog input signals <52> including the mass air flow signal MAF and the value of the air/fuel ratio signal representing the rich or lean condition of the mixture supplied to the engine relative to the stoichiometric ratio. Thereafter, the routine determines the engine speed <54> based upon the frequency of the reference pulses REF.

Next the routine determines a closed loop correction term <56> in the form of a multiplier that trims a computed fuel pulse width. The closed loop correction term provides means for the fuel controller to maintain a constant stoichiometric air/fuel ratio. In general, if the air/fuel signal indicates a lean mixture, the closed loop correction term is adjusted in a direction to cause a richer mixture to be delivered to the engine cylinders. Likewise, if the air/fuel ratio signal is indicating a rich mixture, the closed loop correction term is adjusted in a direction to cause a leaner mixture to be delivered to the engine cylinders. The resulting correction term is the multiplier that is some value greater than 1 to increase the fuel injection pulse width otherwise determined and some value less than 1 to decrease the fuel injection pulse width otherwise determined. The closed loop correction term is comprised of the sum of an integral correction term and a proportional correction term. The integral term is updated <56> based on the state of the air/fuel signal. If the oxygen sensor signal indicates a rich mixture, the integral term is decreased by a predetermined calibrated amount. Conversely, if the air/fuel signal indicates a lean mixture, the integral term is increased by a predetermined calibrated amount. The proportional term of the closed loop correction term is comprised of a predetermined calibration value that is subtracted from the integral term when the air/fuel ratio signal indicates a rich air/fuel mixture and that is added to the integral term if the air/fuel ratio signal indicates a lean air/fuel ratio. As indicated, the sum of these terms provides for the closed loop correction of the otherwise determined fuel injection pulse width in response to the rich/lean state of the mixture as sensed by the exhaust oxygen sensor to establish a stoichiometric air/fuel ratio.

The fuel control algorithm further includes a block learn term in the form of a multiplier for providing a trim on the fuel pulse width calculation to compensate for factors such as system-to-system variations or changes in the engine operating characteristics over time. The fuel algorithm provides for a predetermined number of variables, such as 25, stored in a look-up table in memory at locations referred to as block learn memory cells. The individual memory cells are selected or addressed on the basis of the manifold air pressure and computed engine speed. A particular cell is selected <58> by execution of a look-up routine and the value retrieved from the memory cell addressed by the measured values of manifold air pressure and engine speed comprise the block learn term multiplier for the current speed and pressure conditions. Then the fuel injection pulse width for controlling the fuel quantity to be delivered to the engine is determined <60> and the routine exits to the background loop.

Figure 4:
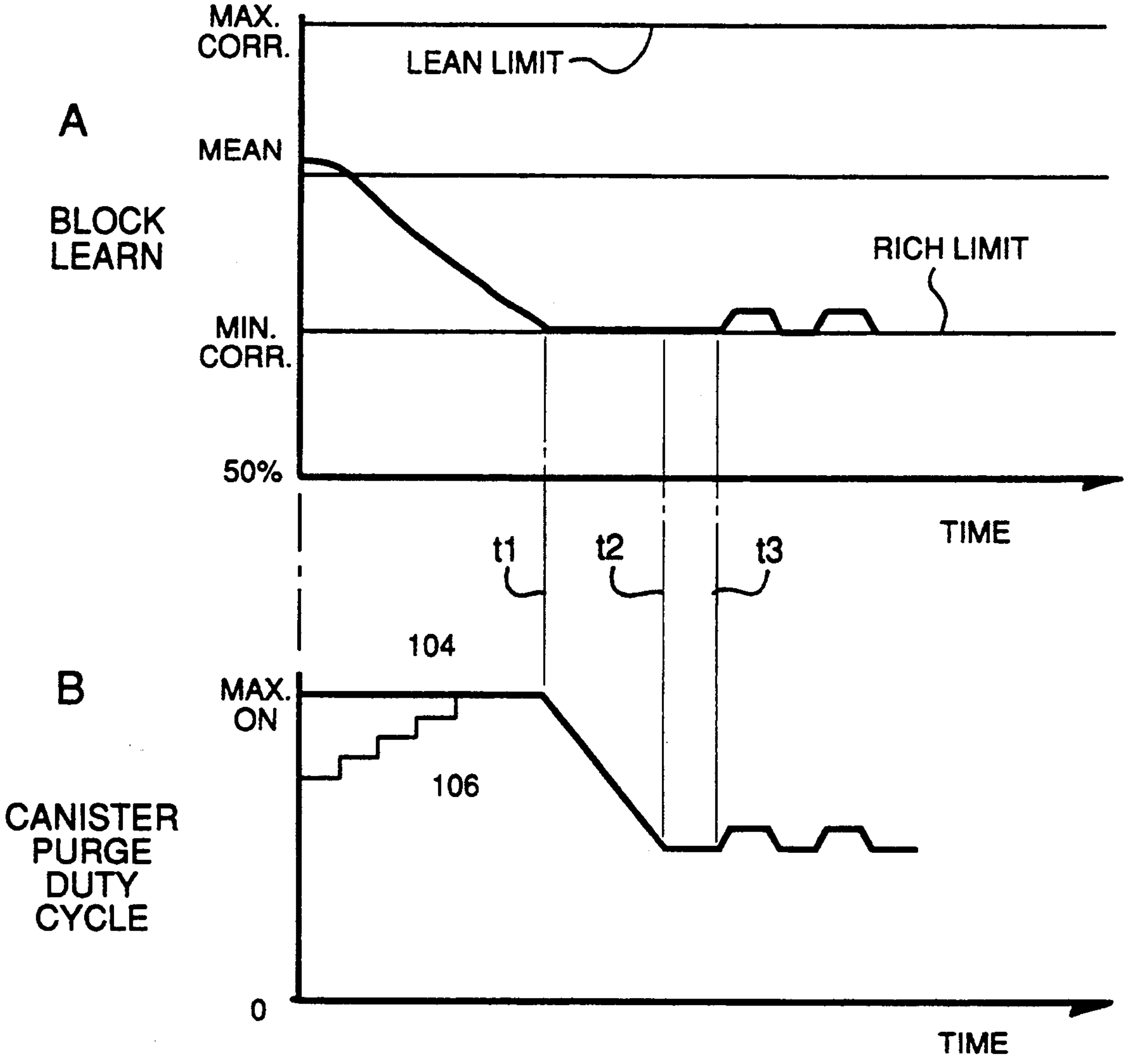
FIG. 4, parts A and B, are graphs illustrating block learn and canister purge duty cycle learn relationships.

Referring to FIG. 3, there is described the routine 64 executed in response to the 100 msec interrupt to update the block learn correction terms in the block learn memory <66>, to control the canister purge <68> and issue output commands for the canister purge. The subroutine of step 66 compares the current learn value to a rich or lean limit which defines the normal control authority or limit of adjustment of the learn term. If the learn value is less than the limit, it is updated based on the closed loop integral correction term. When that integral term is greater than a predetermined value and the air/fuel mixture is lean, the learn value is increased by a calibrated value, i.e. adjusted in the direction to increase the fuel amount. Conversely, if the closed loop integral term is less than a predetermined value and the air/fuel mixture is rich, the learn value is decreased by a calibrated value. The effect of the adjustment of the block learn value is to decrease the correction required by the integral term of the closed loop controller to maintain stoichiometric air/fuel ratio. By continued adjustment of this value over time, the integral term correction is transferred to the block learn value. FIG. 4, part A illustrates the decrease of block learn value to the rich limit when the air/fuel mixture is rich due to canister purge operation.

Figure 6:
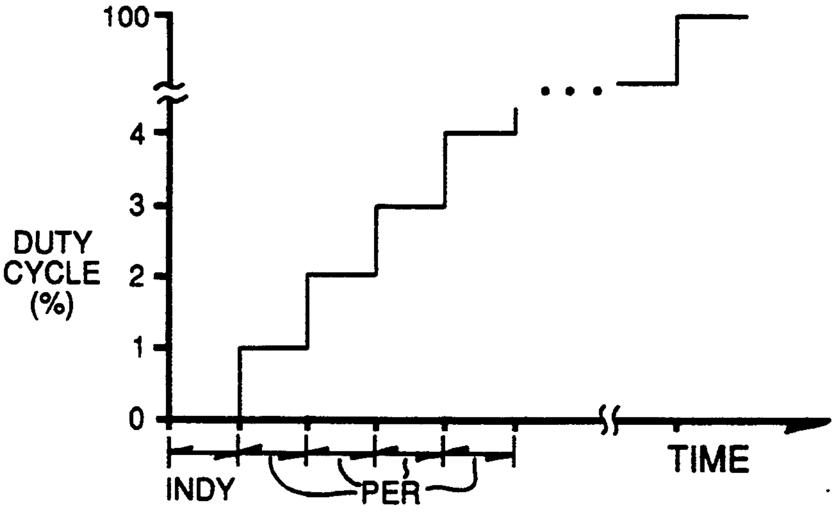
FIG. 6 is a graph illustrating a schedule of maximum purge limits.
Figure 5:
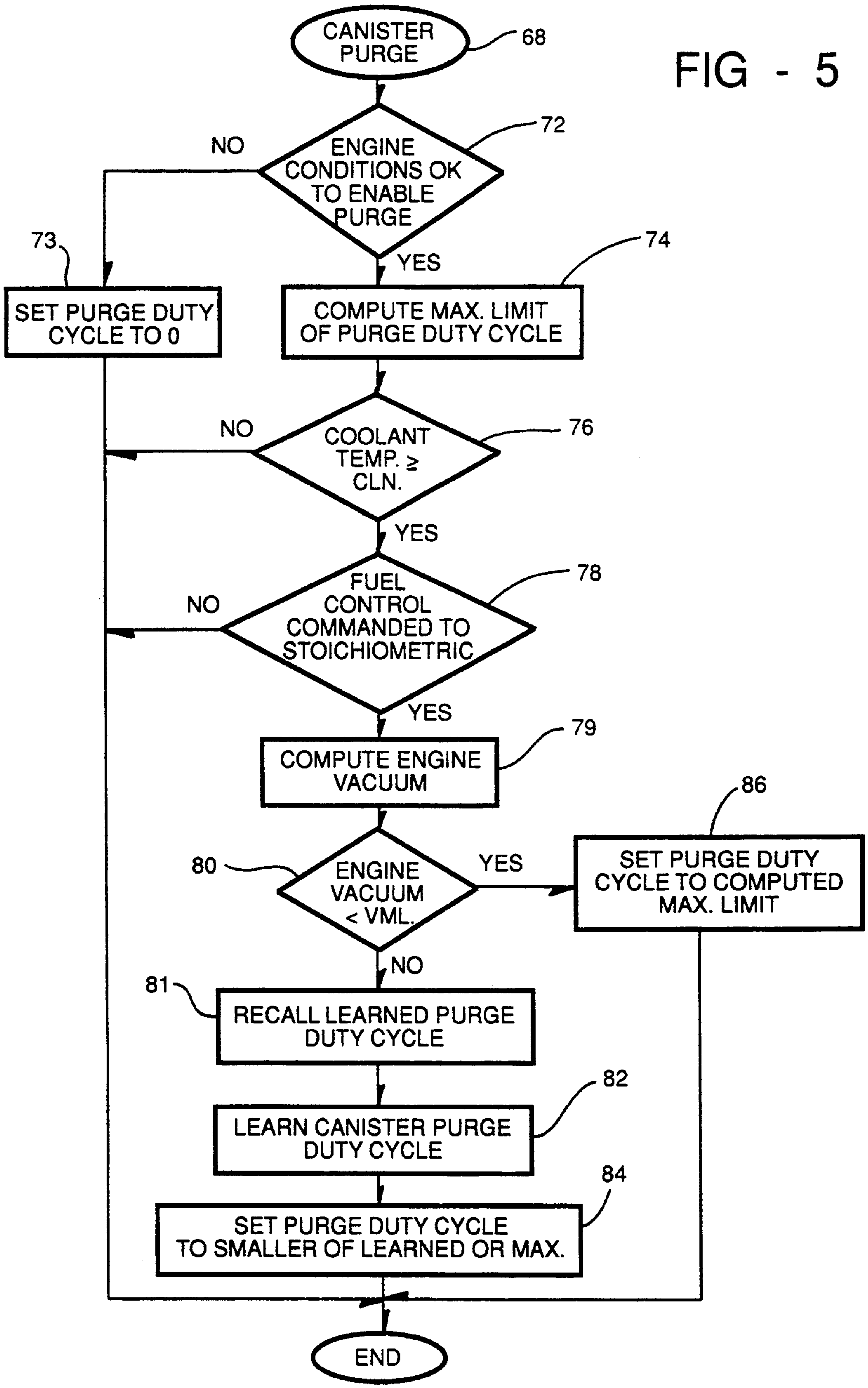

The routine 68 for canister purge logic is illustrated by the flow chart of FIG. 5. The engine and vehicle conditions required to enable canister purge are first evaluated <72>. These conditions are that the coolant temperature is above a set threshold, the throttle switch is open, the vehicle speed has reached a threshold (typically about 20 mph), and the engine speed remains above a first threshold if canister purge is already enabled (e.g. about 800 rpm) or a second threshold if the purge is currently disabled (e.g. about 1100 rpm). If the vehicle is equipped with traction control or uses other functions which require individual cylinder fuel shutoff, these functions must not be disabling any fuel injector. If the canister purge is not enabled <72>, the purge duty cycle is set to 0 <73> and the routine ends. If the purge is enabled, a maximum limit of purge duty cycle is computed <74> according to a scheduled ramp shown in the graph of FIG. 6. The maximum limit begins at 0% duty cycle and increases stepwise beginning at an initial delay INDY after the purge is enabled and is incremented by a fixed step size after each subsequent delay period PER. The initial delay INDY may be 0, for example, the delay periods PER may be 0.2 sec and the step size may be 1% as shown in the drawing.

Continuing in the FIG. 5 flow chart, if the coolant temperature has attained a threshold CLN, which may be 80° C. <76>, and the fuel control is commanding a stoichiometric mixture ratio <78>, the engine vacuum is computed from barometric pressure and MAP <79>. If the engine vacuum is not below a threshold VML, which may be 10 kPa <80>, the learned purge duty cycle is recalled from memory <81> and the program enters a subroutine to learn or update the canister purge duty cycle <82>. Thereafter the purge duty cycle is set to the smaller of the learned duty cycle or the maximum limit <84> and the routine ends. If the engine vacuum is less than the threshold <80> the purge rate will be low and the learn routine, if enabled, would increase the duty cycle to a value that would be too high when the vacuum recovers. Thus the learn routine is bypassed and the duty cycle is set to the computed maximum limit <86>. This allows maximum purge given the low available vacuum and avoids undesirably increasing the learned duty cycle. When the engine is not warmed up <76> or the fuel ratio is not controlled stoichiometrically <78>, the routine ends without entering the learn cycle and the previously set duty cycle is maintained. The coolant temperature used in step 72 to enable purge may be the same temperature CLN used in step 76. In that case, if the engine coolant is below that threshold, the duty cycle will be set to 0 <74>.

Figure 7:
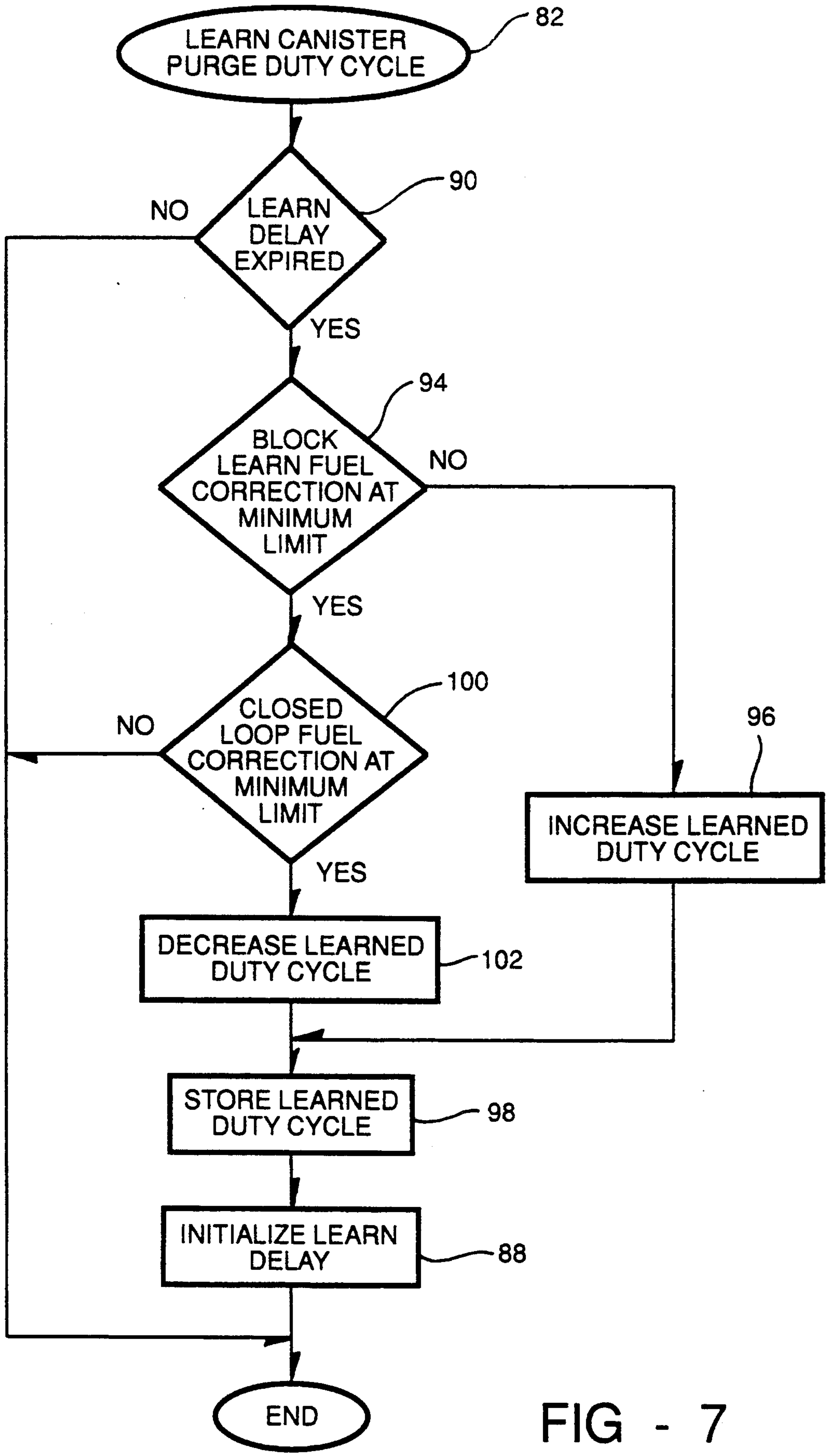

The learn subroutine 82 for learning the canister purge duty cycle is shown in FIG. 7. A learn delay which may be 0.5 sec is initialized at the end of the subroutine <88> to limit the frequency of updates. At the beginning of the subroutine, if the learn delay has not expired <90> the routine ends and if the learn delay has expired <90>, the block learn fuel correction is compared to its minimum limit <94>. If it is above the limit, the learned duty cycle is increased by a fixed value, e.g. 0.4% <96>, the updated duty cycle value is stored in the keep-alive memory <98> and the program control goes to step 88. If the block learn value is at the minimum limit <94> and the closed loop correction is also at its minimum limit <100> the learned duty cycle is decreased by a fixed value e.g. 0.4% <102>, the new value is stored <98> and the program proceeds to step 88. If the closed loop fuel control is not at its minimum value <100> the subroutine ends and the duty cycle decrease does not occur. Thus the block learn correction value must respond to closed loop correction before a duty cycle decrease can occur.

The interrelationship of block learn and purge duty cycle learn is depicted in FIG. 4, parts A and B. In part B, the graph 104 indicates the purge duty cycle is at maximum on for maximum delivery of fuel vapor to the engine which tends to create a rich condition. As a result, the closed loop correction integral term repeatedly reaches its minimum or rich limit and the block learn value gradually decreases to its minimum or rich limit at time t1. Then the subroutine recognizes that the block learn <94> and the closed loop correction term <100> are at minimum values and the duty cycle is decreased <102> repeatedly as long as those conditions obtain to ramp down the curve 104. At time t2, the purge duty cycle is reduced sufficiently for the block learn term to stabilize and then, at time t3, to increase above its limit allowing the purge duty cycle to also increase <94>. The graph portion 106 gives an example of increasing the purge duty cycle when it is less than maximum and the block learn term is above the rich limit.

It will thus be seen that the invention provides a method of controlling the duty cycle of a canister purge control valve in accordance with the values of closed loop and block learn correction terms which in turn are affected by and respond to the amount of fuel vapor furnished to the engine by the canister purge operation. It should be noted that the canister control is consistent with and enhances the achievement of stoichiometric air/fuel ratio by the fuel control system, and facilitates canister purging at the maximum rate permitted by driveability and emissions considerations.

The embodiments of the invention in which an exclusive property or privilege is claimed are defined as follows:

1. A method of controlling a solenoid valve to control a purge flow rate from a fuel vapor collection canister to an internal combustion engine having a system for delivering a mixture of air and fuel to the engine and a closed loop fuel controller for adjusting the fuel delivered to the engine in a fuel increasing or decreasing direction so as to maintain a predetermined air/fuel ratio, the method comprising the steps of:

enabling purge of the fuel vapor collection canister during engine operation, and when purge of the fuel vapor collection canister is enabled:

recalling a learned purge duty cycle stored in a keep-alive memory that stores the learned purge duty cycle while the engine is operated and while the engine is turned off;

operating the solenoid valve at an operating purge duty cycle in accordance with the recalled learned purge duty cycle from the keep-alive memory to admit fuel vapor from the canister to the engine at a rate established by the operating purge duty cycle;

sensing the closed loop fuel controller adjustment of the fuel delivered to the engine; and updating the learned purge duty cycle stored in the keep-alive memory by increasing the stored learned purge duty cycle when the sensed closed loop fuel controller adjustment of the fuel is less than a threshold value and by decreasing the learned purge duty stored when the sensed closed loop fuel controller adjustment of the fuel is above the threshold value.

2. A method of controlling a solenoid valve to control a purge flow rate from a fuel vapor collection canister to an internal combustion engine having a system for delivering a mixture of air and fuel to the engine and a closed loop fuel controller for adjusting the fuel delivered to the engine in a fuel increasing or decreasing direction so as to maintain a predetermined air/fuel ratio, the method comprising the steps of:

enabling purge of the fuel vapor collection canister during engine operating, and when purge of the fuel vapor collection canister is enabled:

ramping a maximum purge duty cycle value from an initial predetermined duty cycle value so that the maximum purge duty cycle value is progressively increased from the initial predetermined duty cycle value beginning at a time the purge of the fuel vapor collection canister is first enabled;

recalling a learned purge duty cycle stored in a keep-alive memory that stores the learned purge duty cycle while the engine is operated and while the engine is turned off;

operating the solenoid valve at an operating purge duty cycle in accordance with a lowest one of the recalled learned purge duty cycle from the keep-alive memory and the maximum purge duty cycle to admit fuel vapor from the canister to the engine at a rate established by the operating purge duty cycle;

sensing the closed loop fuel controller adjustment of the fuel delivered to the engine; and updating the learned purge duty cycle stored in the keep-alive memory by increasing the stored learned purge duty cycle when the sensed closed loop fuel controller adjustment of the fuel is less than a threshold value and by decreasing the learned purge duty stored when the sensed closed loop fuel controller adjustment of the fuel is above the threshold value.

* * * * *